3,041,913
ECCENTRICALLY ADJUSTABLE FASTENER
George W. Liska, West Covina, Calif.
Filed May 7, 1959, Ser. No. 811,613
2 Claims. (Cl. 85—1)

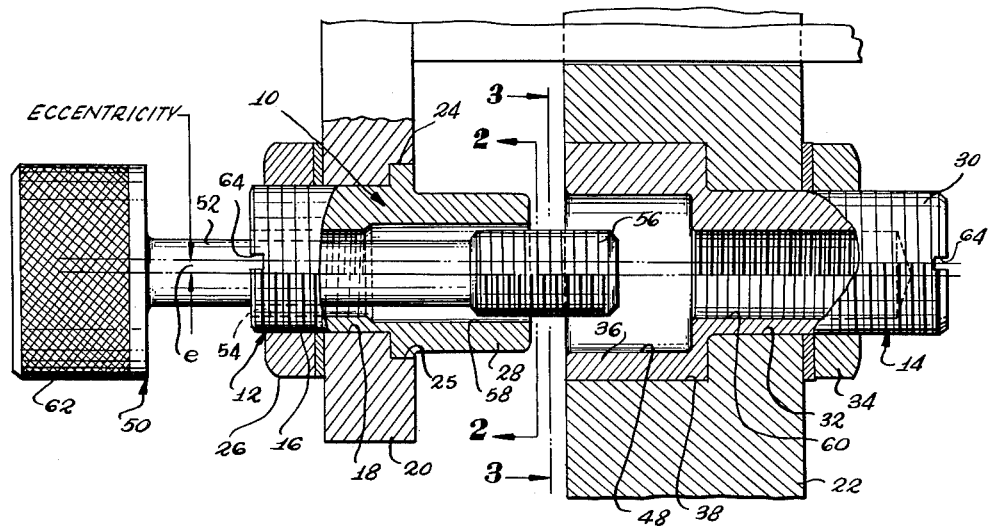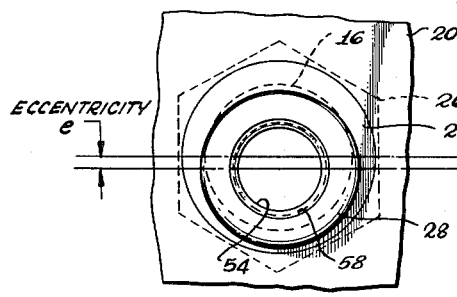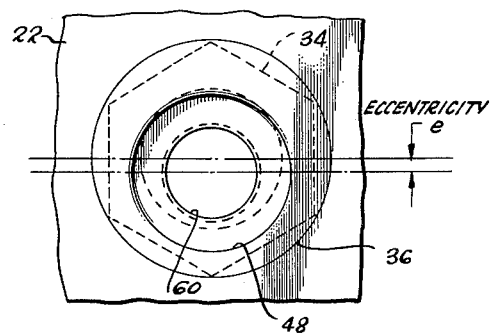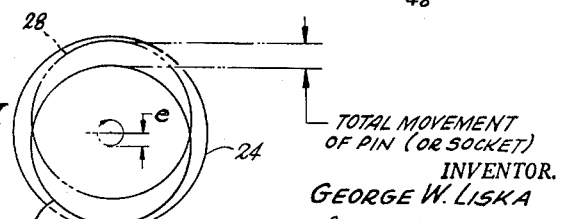

This invention deals generally with fasteners, and more particularly with a unique eccentrically adjustable fastener.

It is common practice to attach one member to another member by means of fasteners, the ends of which are inserted through matching predrilled holes in the members. Unless these holes are drilled with extreme accuracy, the matching holes may be, and most frequently are, slightly misaligned, making insertion of the fasteners difficult or impossible.

Various types of eccentrically adjustable fasteners have been devised to cure this problem. Briefly stated, these fasteners comprise means which allow for limited eccentric adjustment of each fastener to accommodate its insertion in misaligned holes in the members to be joined.

A broad object of the present invention is to provide a new and improved eccentrically adjustable fastener of the character described.

A more specific object of the invention is to provide a fastener equipped with two parts which are eccentrically adjustable to permit insertion of these parts in misaligned holes in two members to be joined.

Another object of the invention is to provide a fastener of the character described equipped with an interfitting pin and socket means which serve the dual function of accommodating eccentric adjustment of the fastener parts and sustaining relatively high shear loads on the fastener.

A further object of the invention is to provide an eccentrically adjustable fastener of the character described which is relatively simple in construction, inexpensive to manufacture, and otherwise especially well suited to its intended function.

Other objects, advantages and features of the invention will become apparent as the description proceeds.

Briefly, the objects of the invention are attained by the provision of a fastener equipped with two parts having shanks at one end rotatably receivable in predrilled holes in the members to be joined. These shanks are provided with means such as lock nuts for securing the parts to their respective members. The other ends of the fastener parts are provided with rotatably interfitting, axially disengageable pin and socket means on an axis eccentric to the axes of the fastener shanks.

The arrangement of the fastener is such that in one relative angular position of the parts the axes of its two shanks are aligned. When the parts are relatively rotated from this position on the axis of the pin and socket, the axes of the fastener shanks become misaligned to accommodate insertion of the fastener in misaligned holes in the members to be joined.

The fastener parts are releasably connected by means of a lock screw carried on one part and engageable in a threaded hole in the other part. This lock screw has a knurled head by which it may be turned to release or join the fastener parts.

A better understanding of the invention may be had from the following detailed description thereof taken in connection with the annexed drawings, wherein:

FIG. 1 is a longitudinal section through the fastener of the present invention and illustrating the parts of the fastener assembled on a pair of members to be joined by the fastener;

FIG. 2 is a section taken along line 2—2 of FIG. 1;
FIG. 3 is a section taken along line 3—3 of FIG. 1; and FIG. 4 is a view illustrating the eccentric adjustability of the present fastener.

Referring now to these drawings, the fastener 10 of this invention will be seen to comprise a pair of separable parts 12 and 14. Part 12 has, at one end, a threaded shank 16 which is adapted to be inserted through a predrilled hole 18 in a member 20 to be attached to a second member 22. Member 22 might comprise, for example, a metal case and the member 20 a front panel for this case.

Intermediate its ends, part 16 has a circular shoulder 24 concentric with its shank 16. Hole 18 in the member 20 is counterbored at 25 to form a recess for receiving the shoulder 24. Part 12 is held on the member 20 by means of a nut 26 threaded on the shank 16 of the part. The opposite end of the part 12 comprises a cylindrical pin 28. The axis of this pin is eccentric to the axis of shank 16 by the amount $e$ in FIG. 2.

Part 14 also comprises a threaded shank 30 at one end. This shank is receivable in a hole 32 in the member 22. The part is attached to the member by means of a nut 34 threaded on the shank 30. The opposite end of the part 14 is radially enlarged to form a cylindrical head 36 concentric with shank 30. Head 36 seats in a counterbore 38 at the left end of the hole 32 in member 22. Head 36 has an axial bore 48 in which the pin 28 on part 12 has a close sliding fit. The axis of bore 48 is eccentric by the amount $e$ to the axis of shank 30 of part 14.

In use of the present fastener, pin 28 of part 12 is inserted into the socket 48 in part 14. The two parts of the fastener are then connected by means of a clamp screw 50. This clamp screw has a stem 52 which extends loosely through an axial bore 54 in part 12. The right-hand end 56 of stem 52 is enlarged and threaded, as shown, and has a loose fit in a counterbore 58 of axial bore 56 within the pin 28. This threaded end 56 of the clamp screw is engageable in a threaded bore 60 in part 14. The clamp screw is rotatable into and out of the bore 60 by means of a knurled head 62 at the left end of the clamp screw.

The parts are so proportioned that when the pin 28 on part 12 is inserted in the socket 48 in part 14, the threaded end 56 of the clamp screw 50 may be threaded into the bore 60 in part 14 until the knurled head 62 on the clamp screw abuts the left end of part 12 to securely clamp the parts 12 and 14 together. The central bore 54 in part 12, through which the stem 52 of the clamp screw 50 extends, is coaxial with the pin 28 on part 12. Similarly, threaded bore 60 in part 14, which receives the threaded end 56 of the clamp screw, is coaxial with the socket 48 in part 14. This permits the angular position of pin 28 in the socket 48 to be changed and the clamp screw 50 retightened in any angular position of the pin so as to permit relative angular adjustment of the parts 12 and 14. The ends of the shanks 16 and 30 have slots 64 by which the two parts of the fastener may be relatively turned.

In actual use, the members 20 and 22 will be joined by a plurality of the present fasteners. When assembling the member 20 on the member 22, if it happens that the pin 28 and socket 48 of a fastener are misaligned due to misalignment of the respective predrilled holes 18 and 22 in the members, the parts of that fastener are merely relatively rotated slightly until the respective pin and socket become aligned. The nuts 26 and 34 on the fasteners are tightened, and the members 20 and 22 are assembled by inserting the pins 28 of the fastener parts 12 into the sockets 48 in the respective fastener parts 14. The clamp screws 50 on the several fasteners are then tightened to securely clamp the member 20 to the member 22.

In order to prevent accidental disengagement of the clamp screw 50 from the fastener part 12, when the latter is separated from the part 14, the bore 54 in part 12 is threaded to fit the threaded end 56 of the clamp screw. Thus, when assembling or disassembling the clamp screw 50 from part 12, the enlarged threaded end 56 of the clamp screw must be threaded through the bore 54.

It will be apparent from the preceding description that there has been described and illustrated an eccentrically adjustable fastener which is fully capable of attaining the objects and advantages preliminarily set forth.

While a present preferred embodiment of the invention has been disclosed for illustrative purposes, various modifications in design and arrangement of parts are possible within the scope of the following claims.

I claim:

1. A fastener comprising a first part having a circular socket which opens at one end through one end of the part and a threaded shank at the other end of the part on an axis eccentric to the axis of said socket, a second part having a pin at one end slidably inserted in said socket and a threaded shank at the other end on an axis eccentric to the axis of said pin, said pin being insertable into and removable from said socket through said one end of the socket and said threaded shank on the second part extending beyond said one end of the first part in a direction away from the threaded shank of the first part, a clamp screw for releasably securing said pin in said socket including a stem extending loosely through a central opening in said second part on the axis of said pin and having a threaded inner end threaded in the first part and an enlarged head on the outer end of said stem beyond said other end of said second part, and a nut threaded on each shank.

2. A fastener comprising a first part having a circular socket which opens at one end through one end of the part, a threaded shank at the other end on an axis eccentric to the axis of the socket, an annular shoulder between said ends of the part facing said other end of the part, and a nut threaded on said shank; a second part having a pin at one end slidably inserted in said socket, a threaded shank at the other end on an axis eccentric to the axis of the pin, an annular shoulder facing said other end of the second part, and a nut threaded on said latter shank, said pin being insertable into and removable from said socket through said one end of the socket and said threaded shank of the second part extending beyond said one end of the first part in a direction away from the threaded shank of the first part; and a clamp screw for reelasably securing said pin in said socket including a stem extending loosely through a central opening in said second part on the axis of said pin and having a threaded inner end threaded in the first part, and an enlarged head on the outer end of said stem beyond said other end of said second part.

References Cited in the file of this patent

UNITED STATES PATENTS

| | | |
|---|---|---|
| 1,097,185 | Oehrle | May 19, 1914 |
| 1,767,019 | Sergeeff | June 24, 1930 |
| 2,639,179 | Phelps | May 19, 1953 |